United States Patent

[11] 3,610,265

| [72] | Inventor | James P. McGuinness<br>Hyattsville, Md. |
|---|---|---|
| [21] | Appl. No. | 808,457 |
| [22] | Filed | Mar. 19, 1969 |
| [45] | Patented | Oct. 5, 1971 |
| [73] | Assignee | Bowles Fluidics Corporation |

[54] FLUIDIC LIMITING NETWORK
7 Claims, 1 Drawing Fig.

| [52] | U.S. Cl. | 137/81.5 |
|---|---|---|
| [51] | Int. Cl. | F15c 1/12 |
| [50] | Field of Search | 137/81.5 |

[56] References Cited
UNITED STATES PATENTS

| 3,001,539 | 9/1961 | Horvitz | 137/81.5 |
|---|---|---|---|
| 3,024,805 | 3/1962 | Horton | 137/81.5 |
| 3,443,574 | 5/1969 | Posingies | 137/81.5 |
| 3,485,253 | 12/1969 | Boothe | 137/81.5 |

*Primary Examiner*—William R. Cline
*Attorney*—Rose & Edell

ABSTRACT: A fluidic circuit is provided for indicating when a variable pressure signal exceeds either limit of a predetermined pressure range. The variable pressure is compared with fixed bias pressures at each of two proportional fluidic amplifiers, the amplifiers in turn feeding respective bistable fluidic elements. If the variable pressure falls below the first bias pressure the first bistable element is switched and provides an output signal. Similarly the second bistable element is switched when the variable pressure exceeds the second bias pressure. Each bistable element feeds back a portion of its output signal to its respective proportional amplifier as an additional bias signal to minimize hysteresis effects in bistable element switching.

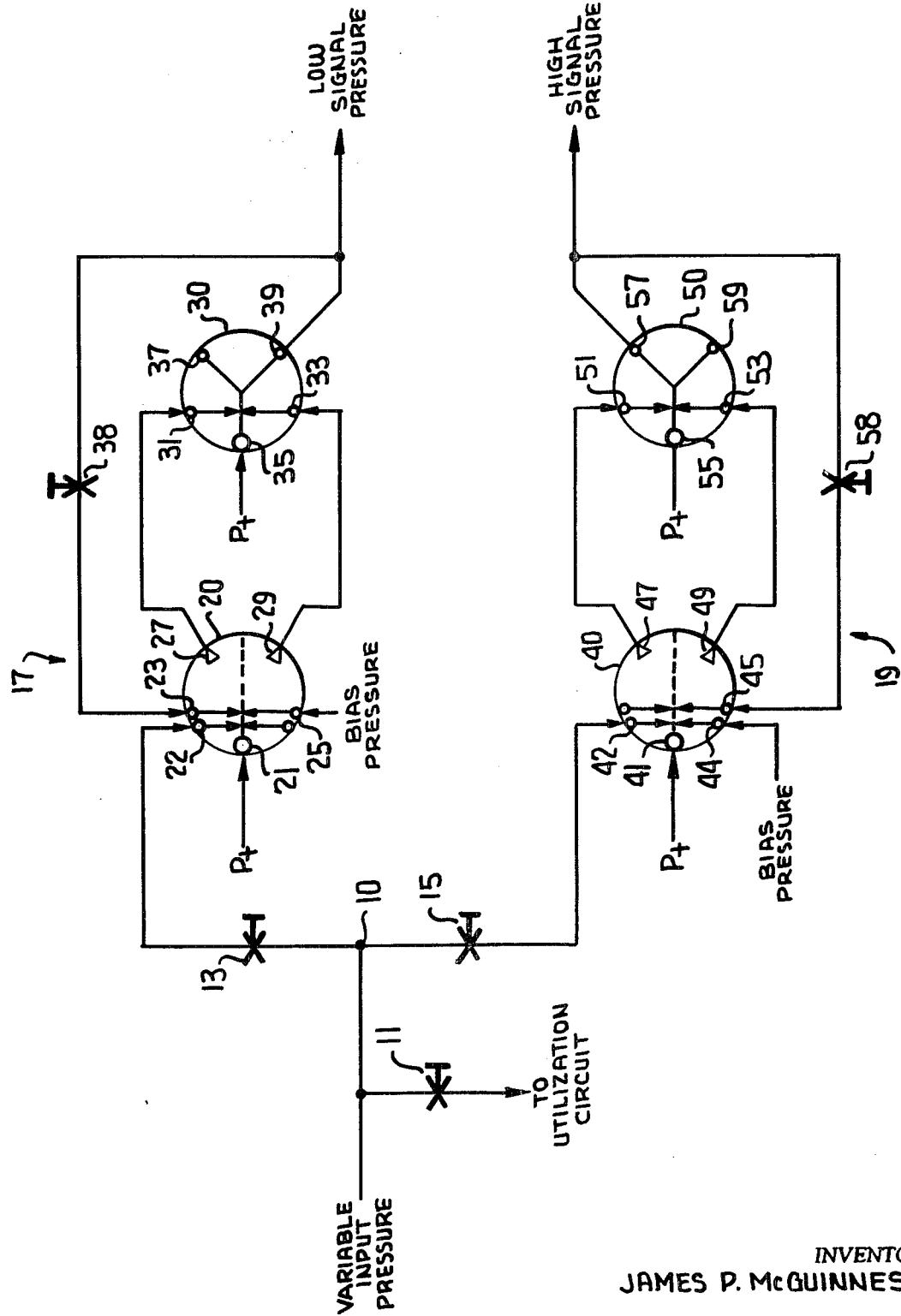

FLUIDIC LIMITING NETWORK

BACKGROUND OF THE INVENTION

The present invention relates to fluidic circuits, and more particularly to a fluidic circuit for indicating whenever a variable pressure signal varies outside a predetermined pressure range.

The fundamental approach to fluid pressure signal limiting an employed herein requires comparison of the controlled signal to two bias pressures representing the respective extremities of a limited pressure range. When the signal exceeds the maximum bias or becomes less than the minimum bias a control signal is generated to effect appropriate control action and/or yield a suitable indication.

Comparison of a variable pressure signal and a fixed pressure bias signal at a bistable fluidic wall attachment device is of itself an old technique. However this technique is relatively inaccurate for many limiting circuit applications because of the inherent hysteresis effects present in the switching characteristics of wall attachment devices. More particularly, if two signals are applied to opposite control ports of a wall attachment bistable device, it would be ideal if switching could be effected by an infinitesimal pressure differential between the two signals. This is not the case however since a significant differential between the signals must be present merely to overcome the wall attachment of the power stream. Thus power stream switching in one direction requires a predetermined pressure differential in a first sense between the input signals; likewise power stream switching in the opposite direction requires a predetermined pressure differential in the opposite sense. The range between these predetermined pressure differentials is significant and can be intolerable in many applications. For example, the bistable element might switch when one signal exceeds the other by a predetermined amount but would not reswitch until said one signal dropped significantly below the other.

It is an object of the present invention to provide a fluidic limiting network in which switching hysteresis is insignificant.

It is another object of the present invention to minimize hysteresis effects in fluidic bistable elements employed for signal comparison purposes.

SUMMARY OF THE INVENTION

In accordance with the principles of the present invention a variable pressure signal and a bias pressure to which the signal is to be compared are fed to opposing control ports of a proportional fluidic amplifier which serves to amplify the difference between the two pressures. The amplified differential pressure is then applied across opposing control ports of a fluidic wall attachment bistable device. The amplification of the pressure differential renders the hysteresis region a much smaller percentage of the amplified differential pressure range than of the unamplified differential pressure range.

In addition, when the variable pressure goes beyond the bias pressure limit, the bistable element limit-switches and a portion of the resulting output signal is fed back to the proportional amplifier as a negative feedback bias signal to decrease the hysteresis range in the bistable element switching characteristic. More particularly, the feedback bias tends to deflect the amplifier power stream in that direction which would cause the bistable device to reswitch. However the feedback sample is sufficiently small so as not to cause reswitching by itself; rather the feedback signal sample is chosen to cause reswitching when the variable pressure assumes the level at which limit-switching of the bistable element occurred.

BRIEF DESCRIPTION OF THE DRAWINGS

The above and still further objects, features and advantages of the present invention will become apparent upon consideration of the following detailed description of one specific embodiment thereof when taken in conjunction with the accompanying drawings, wherein:

The FIG. is a schematic diagram of the preferred embodiment of the present invention.

DESCRIPTION OF THE PREFERRED EMBODIMENT

Referring to the accompanying FIG. there is illustrated a circuit for monitoring a sample of a variable pressure input signal and indicating whenever that sample varies out of a predetermined pressure range. The input signal is applied to a junction 10 between three adjustable flow control valves 11, 13 and 15 from which the signal is divided among three respective circuits. The significantly greatest portion of the signal passes through valves 11 to various utilization circuits in the system. Relatively small samples of the input signal are fed via valves 13 and 15 to low-limit detection circuit 17 and high-limit detection circuit 19 respectively.

Low-limit detection circuit 17 comprises a proportional fluidic amplifier 20 of the stream interaction type and a bistable fluidic element 30 of the wall attachment type. Proportional amplifier 20 comprises a power nozzle 21 responsive to pressurized fluid (P+) applied thereto for issuing a power stream of fluid. A pair of left control nozzles 22, 23 and a right control nozzle 25 respond to respective pressure signals applied thereto for issuing control streams in deflecting relationship with the power stream. The control streams from left control nozzles 22, 23 are directed in opposition to the control stream from right control nozzle 25. The sample of the input signal conducted through valve 13 is applied to left control nozzle 22, and right control nozzle 25 receives a constant bias pressure signal. Left control nozzle 23 receives a feedback signal from element 30 to be described below.

Amplifier 20 further includes left and right outlet passages 27 and 29 respectively which are symmetrically disposed relative to the undeflected power stream so so as to provide a differential output pressure thereacross as a proportional function of the combined pressure differential across the right and both of the left control nozzles.

Outlet passages 27 and 29 are connected to respective left and right control ports 31 and 33 of bistable element 30. A power nozzle 35 responds to pressurized fluid (P+) applied thereto for issuing a power stream within element 30, the power stream being stable only when directed to either one of left and right outlet ports 37 and 39. If the pressure at left control port 31 exceeds the pressure at right control port 33 by a predetermined amount, the power stream switches to right outlet passage 39. Similarly a predetermined pressure excess at right control port 33 over that at left control port 31 switches the power stream to left outlet passage 37. The predetermined pressure excess referred to here is that required to overcome power stream wall attachment. A small portion of the signal provided at right outlet passage 39 is fed back via adjustable flow control valve 38 to left control port 23 of amplifier 20. The greater portion of the signal at outlet passage 39 comprises the "low-signal pressure" indication, indicative that the input signal has fallen below the low-pressure limit.

The low-pressure limit is determined by the bias pressure signal applied to right control port 25. This bias pressure is chosen to effect switching of the power stream of element 30 to right outlet passage 39 whenever the input signal at junction 10 falls below the lower limit pressure for the pressure range in which the input signal is to be maintained. The lower limit pressure, of course, is chosen in accordance, with the requirements of the system in which the present invention is employed.

When the input signal applied to junction 10 is above the lower limit pressure, the pressure at left control port 22 exceeds the bias pressure at right control port 25 and the power stream of amplifier 20 is deflected toward right outlet passage 29. This produces an amplified differential pressure across outlet passages 29 and 27 and hence across control ports 33 and 31 of bistable element 30. Consequently the power stream of element 30 is stably directed toward left outlet passage 37 and no signal is fed back to left control port 23 of amplifier 20.

When the input signal at junction 10 is at a lower pressure than the lower limit pressure, the bias pressure at right control port 25 exceeds that at left control port 22 and the power stream of amplifier 20 deflects toward left outlet passage 27. A resulting amplified differential pressure appears across passages 27 and 29, and hence across control ports 31 and 33. Consequently the power stream of element 30 is stably directed toward right outlet passage 39. At this time a small portion of the "low-signal pressure" signal is fed back via valve 38 to left control port 23 of amplifier 20. Valve 38 is adjusted so that the feedback signal is sufficiently small to not entirely override the bias pressure signal at control port 25 and yet sufficiently high to overcome wall attachment of the power stream at element 30 when the signal at left control port 22 rises to equal the bias pressure at control port 25 in amplifier 20.

High-limit detection circuit 19 comprises a proportional amplifier 40 and bistable element 50 which corresponds in construction and operation to amplifier 20 and bistable element 30 described above. Amplifier 40 has a power nozzle 41, a left control nozzle 42, two right control nozzles 44, 45 and left and right outlet passages 47 and 49. Bistable element 50 has a power nozzle 55, left and right control nozzles 51, 53 and left and right outlet passages 57, 59.

The small portion of the variable input pressure signal passed through valve 15 is applied to left control nozzle 42 of amplifier 40 and a constant bias pressure is applied to right control nozzle 44. A portion of the output signal appearing at left outlet passage 57 of element 50 is fed back via adjustable control valve 58 to right control nozzle 45 of amplifier 40. Left and right outlet passages 47, 49 of amplifier 40 are connected to left and right control ports 51, 53, respectively of bistable element 50.

The output signal provided at left outlet passage 57 of element 50 is the "high-signal" indication, and is present whenever the signal at junction 10 exceeds the maximum limit pressure for that signal. This is accomplished by setting the bias pressure applied to control nozzle 44 at a pressure level which effects switching of the power stream of element 50 to left outlet passage 57 whenever the signal at junction 10 in fact exceeds its high limit pressure.

When the signal at junction 10 is below the high limit pressure, the bias pressure at nozzle 44 is greater than the signal sample pressure at nozzle 42. A greater portion of the power stream of amplifier 40 is thus received by left outlet passage 47 and the pressure at left control nozzle 51 exceeds that at right control nozzle 53 in bistable element 50. The power stream of element 50 is stably directed to right outlet passage 59 and therefore no "high-signal pressure" indication is provided. Likewise, no feedback signal is applied to right control nozzle 45 of amplifier 40.

When the input signal exceeds its high limit pressure, the pressure at nozzle 42 exceeds the bias pressure at nozzle 44 and the amplifier power stream is deflected toward right outlet passage 45. This effects limit-switching at bistable element 50, causing the power stream to be stably directed toward left outlet passage 57 to provide the "high-signal pressure" indication. A small portion of this signal is fed back to right control nozzle 45 via valve 58. Valve 58 is chosen to bias amplifier 45 as necessary to negate hysteresis effects in element 50. Thus, if the input signal pressure begins to fall, the level chosen for the feedback signal assures that element 50 reswitches when the input signal pressure fall to substantially the same pressure at which limit-switching of element 50 was effected.

The "low-signal-pressure" and "high-signal pressure" signals may be employed as indicators or for automatic control purposes. For example, the variable input pressure signal may be a control signal in a fluid operated automatic control system. The control function performed by this signal will generally require input signal tolerances in the form of a range of acceptable operating pressures. The present invention would maintain the signal within this range, for example, by effecting appropriate control of pneumatic or fluidic valves with the "high-signal pressure" and "low-signal pressure" signals.

The invention has particular importance in maintaining output pressure signals from fluidic integrator circuits within a specified pressure range. It is common for integrators of this type to be driven out of their desired pressure range where abnormal integrator inputs signals persist for long periods of time. If the present invention is used to limit the integrator output pressure without effecting the integrator input pressure, the circuitry fed by the integrator can be protected without destroying the stored or integrated signal information. In other words the integrator continues to operate on abnormal input information. But its output pressure, as delivered to utilization circuitry, is limited by appropriate valving controlled by the present invention.

The purpose of amplifiers 20 and 40 is to aid in reducing the effects of hysteresis at elements 30 and 50 respectively. More specifically, and taking amplifier 20 and element 30 for example, it is desired that a very small pressure differential across nozzles 31 and 33 effect switching of the power stream in element 30. However, as described above, a portion of this differential must be employed to overcome power stream wall-attachment, for until wall attachment is overcome the power stream cannot switch. This same problem exists for both limit-switching and reswitching and thus switching and reswitching do not occur at the same pressure differential across nozzles 31 and 33. This provides the hysteresis range discussed above. If the relatively small portion of the input signal passed through valve 13 were compared to the bias pressure at the bistable element 30 instead of being amplified, the hysteresis pressure range at element 30 would span a rather significant portion of the small operating range of differential pressures between the signal sample and bias pressures. By amplifying the differential pressure its effective range, as viewed at control nozzles, 31 and 33 is greatly increased and the hysteresis range becomes a small portion of this increased operated range. Consequently, amplification significantly minimizes the effects of hysteresis at element 30. By employing feedback from element 30 to amplifier 20 the hysteresis is further minimized and rendered effectively insignificant. Of course, the amplification may be dispensed with and negative feedback signals could be connected from outlet passage 39 to control nozzle 33. The level of the feedback signal would be adjusted under such circumstances to produce limit-switching and reswitching at the same input signal pressure.

While I have described and illustrated one specific embodiment of my invention, it will be clear that variations of the details of construction which are specifically illustrated and described may be resorted to without departing from the true spirit and scope of the invention as defined in the appended claims.

I claim:

1. A fluidic limiting circuit for providing an indication whenever the pressure of an input signal exceeds a predetermined maximum pressure, said circuit comprising:

a proportional fluidic amplifier of the stream interaction type having a power nozzle responsive to pressurized fluid supplied thereto for issuing a power stream of fluid, first second and third control nozzles responsive to respective fluid signals applied thereto for issuing control streams to deflect said power stream as a combined function of said respective fluid signals, said third control nozzle being adapted to issue its control stream in a sense opposite to that of the control stream issued from said first and second control nozzles, and a pair of outlet passages disposed for differentially receiving said power stream as a function of power stream deflection;

a bistable fluidic element having first and second outlet passages and first and second input ports and providing a fluid output signal from said first outlet passage when in a first stable state and from said second outlet passage when in a second stable state, said bistable element assuming said first stable state when the pressure at said first control pot exceeds the pressure at said second control port by a first predetermined amount and assuming said second stable state when the pressure at said second control port exceeds the pressure at said first control port by a second predetermined amount;

means for providing a fluid flow connection between said first input port of said bistable element and one of said pair of outlet passages of said fluidic amplifier and between said second input port of said bistable element and a second of said pair of outlet passages of said fluidic amplifier;

means for applying said input signal to said third control port of said fluidic amplifier;

means for applying a constant bias pressure to said first control port of said fluidic amplifier, said bias pressure being chosen to effect switching of said bistable element to said first stable state whenever the input signal pressure exceeds said predetermined maximum pressure; and negative feedback means for applying a portion of the signal at said first outlet passage of said bistable element to said second control port of said fluidic amplifier, said portion being chosen to effect switching of said bistable element to said second stable state whenever the pressure of said input signal fails to exceed said predetermined maximum pressure.

2. The fluidic limiting circuit according to claim 1, further comprising a second circuit for indicating whenever the pressure of said input signal falls below a predetermined minimum pressure, said second circuit comprising:

a second proportional fluidic amplifier of the stream interaction type having a power nozzle responsive to pressurized fluid supplied thereto for issuing a power stream of fluid, first, second and third control nozzles responsive to respective fluid signals applied thereto for issuing control streams to deflect said power stream as a combined function of said respective fluid signals, said third control nozzle being adapted to issue its control stream in a sense opposite to that of the control stream issued from said first and second control nozzles, and a pair of outlet passages disposed for differentially receiving said power stream as a function of power stream deflection;

a second bistable fluidic element having first and second outlet passages and first and second input ports and providing a fluid output signal from said first outlet passage when in a first stable state and from said second outlet passage when in a second stable state, said second bistable element assuming said first stable state when the pressure at said first control port exceeds the pressure at said second control port by a first predetermined amount and assuming said second stable state when the pressure at said second control port exceeds the pressure at said first control port by a second predetermined amount;

means for providing a fluid flow connection between said first input port of said second bistable element and one of said pair of outlet passages of said second fluidic amplifier and between said second input port of said second bistable element and a second of said pair of outlet passages of said second fluidic amplifier;

means for applying said input signal to said first control port of said second fluidic amplifier;

means for applying a constant bias pressure to said third control port of said second fluidic amplifier, said bias pressure being chosen to effect switching of said second bistable element to said first stable state whenever the input signal pressure falls below said predetermined pressure; and negative feedback means for applying a portion of the signal at said first outlet passage of said second bistable element to said second control port of said second fluidic amplifier, said portion being chosen to effect switching of said second bistable element to said second stable state whenever the pressure of said input signal is equal to or greater than said predetermined minimum pressure.

3. A fluidic switching circuit responsive to a pair of input pressure signals for providing an output signal when the pressure of a first of said pair of input signals exceeds the pressure of the second of said pair of input signals by a predetermined pressure, said circuit comprising:

a bistable fluidic switching element of the wall attachment type responsive to said first input signal pressure exceeding said second input signal pressure by said predetermined pressure for assuming a first stable state and responsive to said second input signal pressure exceeding said first input signal pressure by a specified pressure for assuming a second stable state; and control means responsive to said fluidic switching element in said first stable state for augmenting said second input signal pressure to a pressure which exceeds said first input signal pressure by slightly less than said specified pressure when the unaugmented second input signal pressure are equal.

4. A fluidic switching circuit for providing an output signal when the pressure of a first input pressure signal is equal to or exceeds the pressure of a second input pressure signal, said circuit comprising:

bistable fluidic switching means of the wall-attachment type responsive to said first input signal pressure exceeding said second input signal pressure for assuming a first stable state; and control means responsive to said fluidic switching means in said first stable state for augmenting said second input signal pressure to a pressure insufficient to switch said bistable fluidic switching element from said first stable state unless the unaugmented second input signal pressure exceeds said first input signal pressure.

5. Fluidic apparatus for providing an accurate indication of which of first and second fluid signals has a greater amplitude, said apparatus comprising:

a fluidic element of the wall attachment type comprising: an interaction region having at least one sidewall; a nozzle responsive to application of pressurized fluid thereto for issuing a power stream of fluid into said interaction region; a first control port arranged to respond to said first fluid signal thereto by issuing a first control stream tending to deflect said power stream toward said sidewall; a second control port arranged to respond to application of said second fluid signal thereto by issuing a second control stream tending to deflect said power stream away from said sidewall; said sidewall being disposed to effect boundary layer attraction of said power stream when said power stream is deflected toward said sidewall; an output passage disposed to receive said power stream when the latter is attached to said sidewall; and a feedback passage for receiving a portion of the power stream received by said outlet passage;

means responsive to said portion of said power stream for introducing additional fluid into said interaction region to aid deflection of said power stream away from said sidewall, said additional fluid having a pressure which is insufficient of itself to cause said power stream to detach from said sidewall but sufficient to so detach said power stream whenever said second fluid signal has a greater amplitude than said first fluid signal.

6. A fluidic switching circuit for providing an output signal when the pressure of a first input signal exceeds the pressure of a second input signal, said switching circuit comprising:

a fluidic amplifier for amplifying the pressure difference between the pressures of said first and second input signals;

a bistable fluidic element adapted to assume a first stable state when the amplified pressure difference exceeds a specified pressure difference in one sense, and for assuming a second stable state when said amplified pressure difference exceeds a specified pressure in a second sense opposite said one sense, said specified pressure difference in said one sense occurring when the pressure of said first input signal exceeds the pressure of said second input signal; and feedback means responsive to said bistable fluidic means in said first stable state for applying a fluid signal to said amplifier means in a negative feedback sense and at a pressure level insufficient to cause said bistable fluidic element to assume said second stable state unless the pressure of said second input signal exceeds the pressure of said first input signal.

7. A fluidic limiting network for detecting variation of a fluid pressure signal outside a range of pressures, said network comprising:

sources of first and second bias pressures, said bias pressure defining, respectively, the upper and lower extremities of said range of pressures;

a first analog fluidic amplifier for comparing said fluid pressure signal and said first bias pressure;

a first bistable fluidic element of the wall attachment type responsive to said first amplifier for assuming a first stable state when said fluid pressure signal exceeds said first bias pressure;

feedback means responsive to said first bistable element in said first stable state for supplying feedback fluid to augment said first bias pressure at said first amplifier, said feedback fluid having a pressure which is insufficient to cause said first bistable element to switch from said first stable state unless said fluid pressure signal falls below the unaugmented first bias pressure;

a second fluidic amplifier for comparing said fluid pressure signal and said second bias pressure;

a second bistable fluidic element of the wall attachment type responsive to said second amplifier for assuming one stable state when said fluid pressure signal is less than said second bias pressure;

further feedback means responsive to said second bistable element in said one stable state for supplying feedback fluid to augment said fluid pressure signal at said second amplifier, said feedback fluid having a pressure which is insufficient to cause said bistable element to switch from said one stable state unless said fluid pressure signal rises above second bias pressure.